(12) United States Patent
Engström et al.

(10) Patent No.: US 7,513,717 B2
(45) Date of Patent: Apr. 7, 2009

(54) FACE MILLING INSERT

(75) Inventors: Tord Engström, Sandviken (SE); Magnus Åström, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/375,571

(22) Filed: Mar. 15, 2006

(65) Prior Publication Data
US 2006/0216122 A1 Sep. 28, 2006

(30) Foreign Application Priority Data
Mar. 16, 2005 (SE) .................................. 0500622

(51) Int. Cl.
*B23C 5/20* (2006.01)
(52) U.S. Cl. ................. 407/113; 407/114; 407/115
(58) Field of Classification Search ............. 407/113, 407/42, 48, 102, 100, 114, 115
See application file for complete search history.

(56) References Cited

U.S. PATENT DOCUMENTS

| | | | |
|---|---|---|---|
| 4,318,645 A * | 3/1982 | McCreery .................. 407/114 |
| 4,915,548 A * | 4/1990 | Fouquer et al. ............ 407/114 |
| 5,199,827 A | 4/1993 | Pantzar |
| 5,388,932 A * | 2/1995 | DeRoche et al. ............ 407/113 |
| 5,628,590 A | 5/1997 | Beeghly et al. |
| 5,807,031 A | 9/1998 | Arai et al. |
| 5,810,520 A * | 9/1998 | Hintze et al. ............... 407/114 |
| 6,050,752 A | 4/2000 | DeRoche |
| 7,147,407 B2 * | 12/2006 | Satran ........................ 407/42 |

FOREIGN PATENT DOCUMENTS

| | | |
|---|---|---|
| EP | 1297922 A1 | 4/2003 |
| SE | 502196 | 9/1995 |

* cited by examiner

*Primary Examiner*—Boyer D Ashley
*Assistant Examiner*—Sara Addisu
(74) *Attorney, Agent, or Firm*—Drinker Biddle & Reath LLP

(57) ABSTRACT

A face milling insert comprising a pair of main cutting edges which are spaced apart from a center and meet at a corner where they transform into a surface wiping secondary edge, which is intersected by a bisector defining the corner between the main cutting edges, inside each main cutting edge a slope surface being formed, which slopes towards a countersunk bottom surface in a chip surface. A shoulder, having a top side situated at a higher level than the bottom surface, extends inwardly from the secondary edge, the slope surface of the main cutting edge that actively co-operates with the secondary edge, terminating at the shoulder.

6 Claims, 3 Drawing Sheets

FACE MILLING INSERT

FIELD OF THE INVENTION

This present invention relates to a face milling insert for use in milling tools. More particularly, the present invention relates to a face milling insert comprising a pair of main cutting edges which are spaced apart from a center and meet at a corner where they transform into a surface wiping secondary edge, which is intersected by a bisector defining the corner between the main cutting edges, inside each main cutting edge a slope surface being formed, which slopes towards a countersunk bottom surface in a chip surface.

BACKGROUND OF THE INVENTION

Cutting inserts of the type stated above are used in milling tools for face milling. In this application, the cutting inserts are mounted in insert seats in a number of peripherally spaced-apart pockets in a milling cutter body being rotatable around a central axis, which body during machining of a workpiece is set in a translational feeding motion, usually perpendicular to said axis, at the same time as the same is brought to rotate. In this connection, the main cutting edges of the milling cutter are facing radially outward from the rotation axis of the milling cutter body in order to remove chips from the workpiece in a material layer of a desired depth, while the secondary edges of the cutting insert (which by those skilled in the art usually are denominated "wiper edges") are located in a common plane and directed inward from the peripherical main cutting edges, in order to, in such a way, exert a surface-wiping or surface-smoothing effect on the generally planar surface, which is generated in the workpiece after the chip removal.

For different purposes, the cutting inserts, in practice being most often flat, can be located at different angles in relation to the milling cutter body. Thus, the individual cutting insert may be inclined or "tipped-in" in a negative as well as a positive angle with the rotation axis, seen not only axially but also radially. Generally, the cutting inserts work easier and more efficient at larger axial angles than at small or negative axial angles. However, the strength and geometry of the cutting inserts, for example practicable clearance angles, impose limits on the maximal axial angles that can be realized.

The problems that the present invention aims at solving are related to cutting inserts for face mills. Thus, it has turned out that easy-cutting cutting inserts, i.e., cutting inserts having a positive geometry of the type initially mentioned, which are mounted with large axial angles (>15°) in the milling cutter body, run the risk of breaking into pieces and having a short service life. Among other things, such cutting inserts are frequently damaged mechanically by the fact that a limited portion of the chip surface in the immediate vicinity of the secondary edge or wiper edge at a corner and the transition thereof into the main cutting edge, is peeled off by the hot chips. If such damage, limited per se, arises, the chip, being viscous by the heat, will shortly thereafter adhere to and pull along with it the area of the chip surface being inside, and in such a way peel off large parts of the surface layer of the cutting insert that determines the geometry of the chip surface. By those skilled in the art, such damages are denominated "topslice fractures". Damages of this type become particularly frequent when the cutting inserts have large edge rounding offs, and when the material that is machined generates large quantities of heat energy.

A conceivable solution to the above-mentioned problem would be to form the top side of the cutting insert in the shape of a planar, smooth surface. In such a way, the cutting insert in the area of the secondary edge would become stronger and easier be able to resist the planing or shearing effect of the chip. However, such a cutting insert would get a drastically deteriorated performance, among other things because the contact length of the chip against the top side would become considerably larger, with increased cutting forces as a consequence.

U.S. Pat. No. 6,050,752 discloses a cutting insert intended for milling, which insert, adjacent to each one of four surface-wiping secondary edges or wiper edges, has a planar surface that is located at a higher level than the surrounding parts of the chip surface. However, in this case, the cutting insert lacks any positive chip-cutting slope surface adjacent to the individual main edge. Thus, a channelled or waved part of the chip surface extends inward from the main edge in a negative chip angle, which is even larger than the chip angle of the corner surfaces.

SE 502196 C2 discloses a cutting insert for milling, more exactly 90° square shoulder milling, the cutting insert including, in the vicinity of each corner, a ridge being raised relative to the rest of the ship surface, the ridge extending from a wiper edge towards the center of the insert. In this case, however, the ridge as well as the wiper edge are displaced laterally in relation to the curved edge portion, which forms the actual corner of the insert as defined by a bisector between two meeting main cutting edges. This implies that the insert in question runs exactly the same risk to be damaged as the above-mentioned inserts, more specifically topslice fractures being initiated at the fragile curved edge portion in the corner.

SUMMARY

The present invention aims at managing the above-mentioned problem and at providing an improved cutting insert for face milling. Thus, a primary object of the invention is to provide an efficient and easy-cutting face milling insert having improved resistance against mechanical damage in the chip surface, wherein the cutting insert in particular should be suitable for mounting with large axial angles in milling cutter bodies. An additional object is to provide a multi-edged cutting insert having a positive basic geometry, i.e., having marked clearance angles and positive slope surfaces adjacent to the main edges. Furthermore, the cutting insert should guarantee the shortest possible contact length for the chips that are separated by the individual main edge. It is also an object to provide a cutting insert that can be manufactured in a simple way.

A first aspect of the present invention pertains to a face milling insert, comprising a pair of main cutting edges which are spaced apart from a center and meet at a corner where they transform into a surface wiping secondary edge, which is intersected by a bisector defining the corner between the main cutting edge, inside each main cutting edge a slope surface being formed, which slopes towards a countersunk bottom surface in a chip surface, wherein a shoulder, having a top side situated at a higher level than said bottom surface, extends inwardly from the secondary edge along the bisector, the slope surface of the main cutting edge that actively cooperates with the secondary edge, terminating at the shoulder.

DETAILED DESCRIPTION OF PREFERRED EMBODIMENTS

Figure 1:
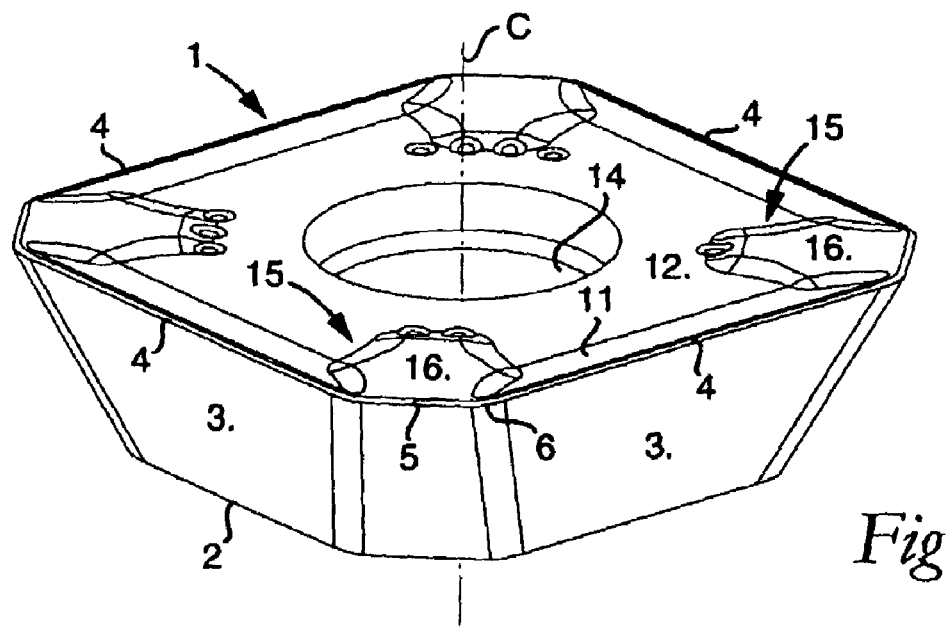
FIG. 1 is a perspective view, regarded obliquely from above, of a first embodiment of a cutting insert according to the invention.

FIGS. 1-5 illustrate a cutting insert made in accordance with the invention, which is intended for the face milling of above all metallic workpieces (although other materials may be possible too). In practice, the cutting insert is usually manufactured from cemented carbide or another equivalent material having a great hardness and wear resistance.

In a conventional way, the cutting insert has a top side 1 serving as a chip surface and a bottom side 2 between which a circumferential clearance surface generally designated 3 extends. In the example, the cutting insert is multi-edged. More precisely, the same has a square basic shape and presents four main cutting edges 4, which are formed in the transition between the top side 1 and the clearance surface 3. Each such main cutting edge 4 co-operates with a secondary edge or wiper edge 5, which extends at an angle to the main cutting edge. In this embodiment, adjacent main cutting edges 4 extend at 90° to each other and meet at corners defined by bisectors D (see FIG. 3). Each secondary edge 5 forms an angle of 90° with the bisector D, meaning that the angle δ between each main edge 4 and an imaginary extension of a secondary edge 5 amounts to 45°. In other respects, it should be pointed out that the top and bottom sides 1,2 are mutually parallel and define the neutral plane of the cutting insert. In addition, the cutting insert is positive so far that the clearance surface 3 forms an acute angle α (see FIG. 2) with an imaginary plane shown by dash-dotted lines and being perpendicular to the neutral plane. The angle α should amount to at least 7° and at most 30°. In the example, the angle α amounts to 20°.

As has been pointed out above, the main cutting edge 4 has the purpose of effecting the chip removal from the workpiece, while the secondary edge 5 has the purpose of wiping off the essentially planar surface in the workpiece that is generated by the chip removal. A transition designated 6 between the edges 4,5 is arched and has a limited radius. Also the proper secondary edge 5 may be arched, although by such a large radius of curvature that the arch shape is not seen by the naked eye. Therefore, in the planar view according to FIG. 3, the edges 5 are shown having lines, which to the eye appear as straight.

Figure 2:
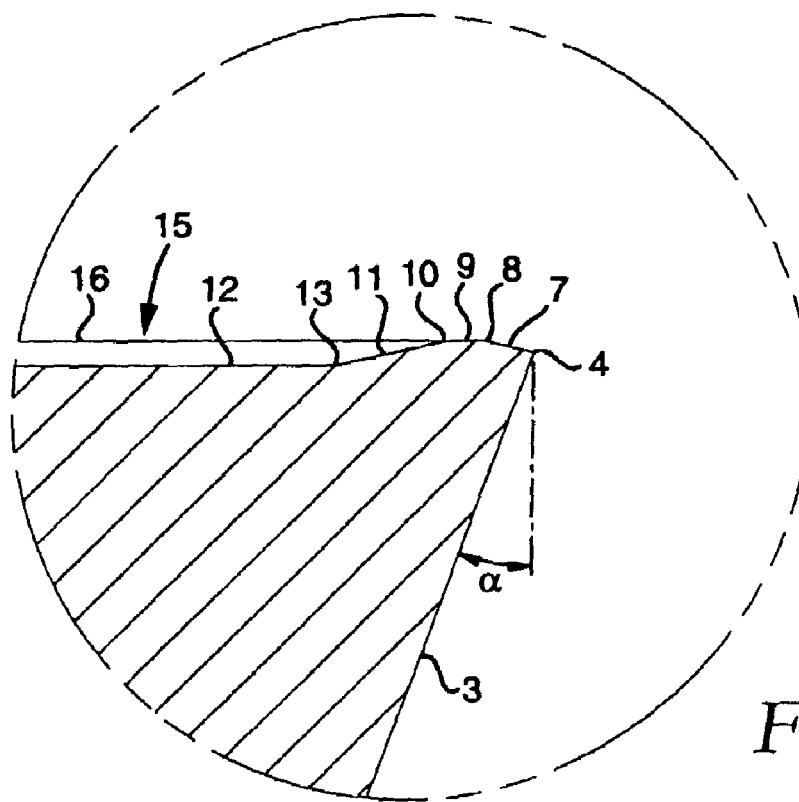
FIG. 2 is an extremely enlarged detail section showing the design of a chip surface adjacent to a main edge of the cutting insert (see also FIG. 4).

Reference is now made to FIG. 2, which in detail illustrates the shape of the top side or chip surface 1 of the cutting insert adjacent to the individual main cutting edge 4. Closest to the clearance surface 3, there is a reinforcing chamfer surface 7, which via a turning line 8 transforms into a second chamfer surface 9 at an obtuse angle to the surface 7. Via an additional turning line 10, the chamfer surface 9 transforms into a slope-like surface 11, which in turn leans or slopes in the direction downward/inward toward a countersink designated 12 in the chip surface 1. In the example according to FIGS. 1-5, the transition between the surfaces 11 and 12 includes a third turning line 13.

It is clearly seen from the enlarged section in FIG. 2 that at least the chamfer surface 9 is situated at a higher level than the countersink or the bottom surface 12. In the example, all surfaces 7, 9, 11 and 12 have been illustrated in the shape of planar surfaces. However, this does not exclude the possibility that the surfaces also may have a curved shape. For instance, the slope surface 11 inclined inward and downward may have a concavely curved shape. It should also be pointed out that the countersunk bottom surface 12 in the embodiment according to FIGS. 1-5 is planar and extends all the way up to a central hole 14 for a conventional tightening screw (not shown). A center axis C of this hole also constitutes the center of the cutting insert in its entirety.

The above-noted features are common to many prior art cutting inserts. However, prior art cutting inserts also include slope surfaces 11 not only inside all main cutting edges 4, but also inside their end transitions towards the corners.

The cutting insert of the present invention includes a shoulder 15 having a top side 16 situated at a higher level than the countersink or the bottom surface 12, extending inward 14 from each secondary edge 5. In the example, the chamfer surface 9 is parallel to the neutral plane of the cutting insert, the chamfer surface 9 and the top side 16 of the shoulder 15 being located in a common plane. In other words, in this case also the top side 16 of the shoulder is planar and parallel to the neutral plane of the cutting insert. However, as will be clear below, also other designs of the shoulder are feasible.

Figure 3:
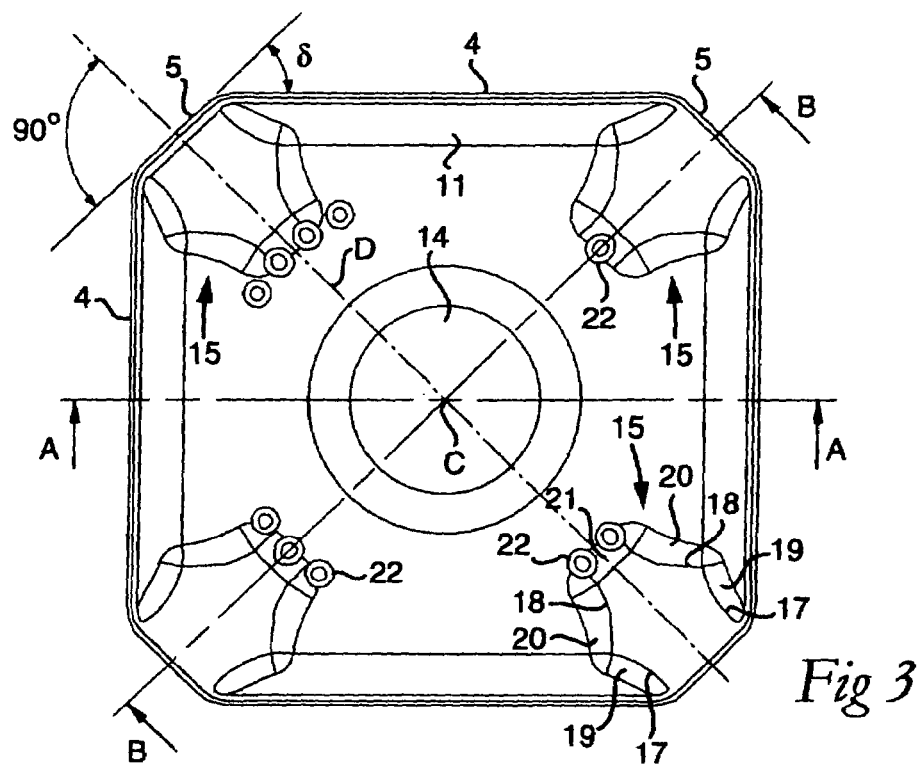
FIG. 3 is a planar view from above of the cutting insert according to FIG. 1.
Figure 4:
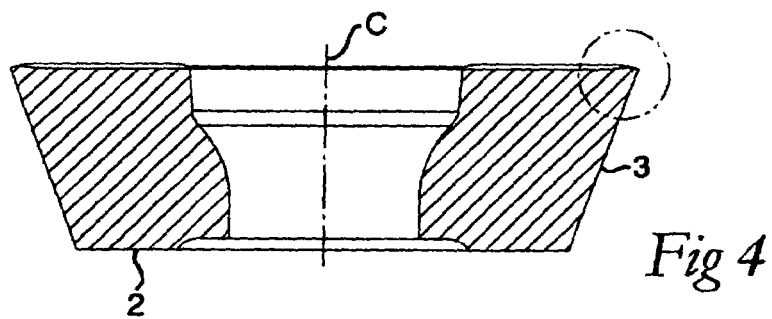
FIG. 4 is a section A-A in FIG. 3.
Figure 5:
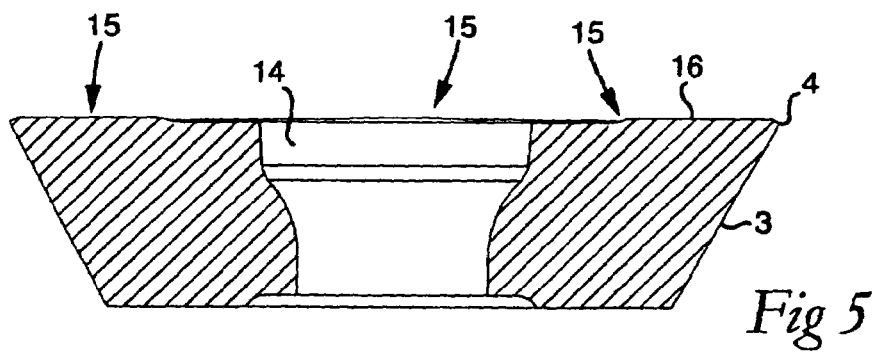
FIG. 5 is a section B-B in FIG. 3.

In FIG. 3, the width of the shoulder 15—such as this is determined by the extension of the top surface 16 in the direction parallel to the secondary edge 5—is substantially equally large as the length of the secondary edge. The length of the shoulder—counted as the extension of the top side 16 from the secondary edge 5 in the direction radially inward toward the center C of the cutting insert—is larger than the width of the shoulder. In the shown, preferred embodiment, the shoulder has a shape such that the width of the top side 16 first successively increases in the direction from the secondary edge 5, by the fact that the top side is delimited by diverging, arched border lines 17, and then successively tapered in the direction inward towards the center of the cutting insert, more precisely by the fact that the top side is delimited by converging, arched border lines 18.

Preferably, the shape of the shoulder is such that the top side 16 of the shoulder transforms into surrounding portions 11, 12 of the chip surface via flatly leaning transition portions. More precisely, adjacent to the border lines 17, the top surface 16 transforms into the slope surface 11 via flatly leaning, suitably concavely curved transition surfaces 19, while the inner portion of the surface 16, which is delimited by the border lines 18, transforms into the countersunk surface via similar transition surfaces 20. At the end thereof directed toward the center hole 14, the top surface 16 transforms into the bottom surface 12 via a transition surface 21 leaning flatly in an analogous way.

In this connection, it should be born in mind that all pairs of edges 4, 5, are generally straight and located in a common plane, which is parallel to the neutral plane of the cutting insert. In the example shown, the individual shoulder 15 is equally thick in the area below the top surface 16, which has a planar shape. This means that the top surface 16, along the entire extension thereof, is parallel to the plane being common to the edges 4, 5, although located at a somewhat higher level than the same.

Furthermore, with reference to FIG. 3, each individual slope surface 11 inside the different main edges 4 extends all the way between two adjacent shoulders 15. In particular, the slope surface 11—having the principal purpose of minimizing the contact length of the chip along the chip surface—extends in all essentials along the entire length of the individual main edge 4. In such a way, it is guaranteed that the easy-cutting capability of the main edge is retained along the entire length of the edge; that is, the cutting insert can be utilized for not only small cutting depths, but also large cutting depths, the maximum depth being determined by the actual length of the main edge. Because the cutting insert is preferably made in one single piece, and most preferably by compression-moulding and sintering, the above-described shoulders should constitute integrated parts of the cutting insert. In this context, it should be pointed out that the cutting insert, in connection with the manufacture, may be made having different embossings 22, which distinguish the corners and shoulders of the cutting insert from each other. In such a way, the indexing of the cutting insert by the user is facilitated.

Figure 6:
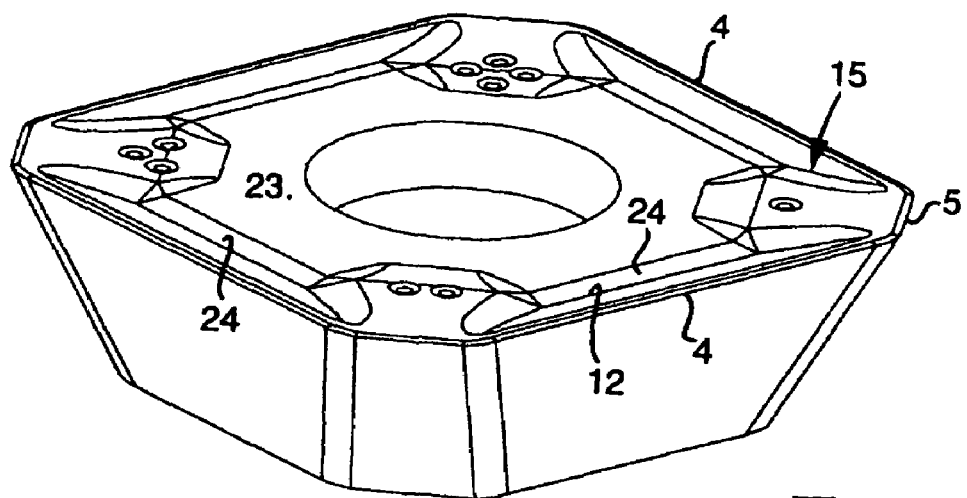
FIG. 6 is a perspective view showing a second, alternative embodiment of the cutting insert according to the invention.
Figure 7:
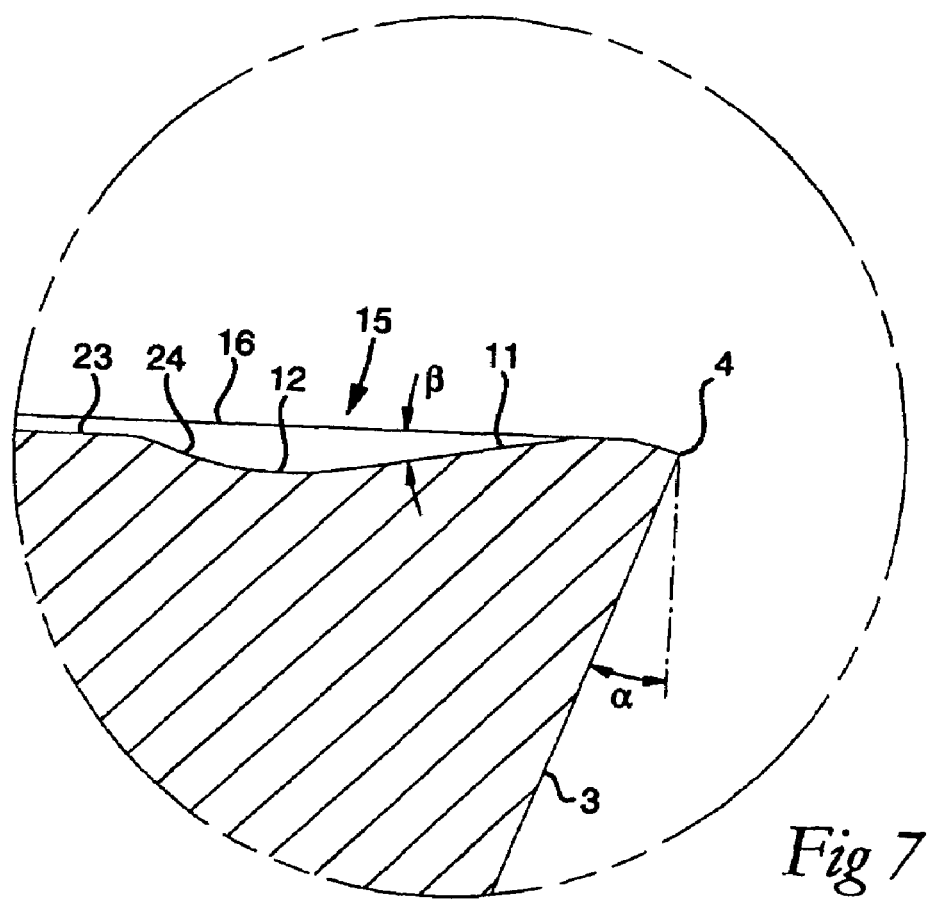
FIG. 7 is an enlarged detail section illustrating the geometry of the chip surface of the cutting insert according to FIG. 6.

In FIGS. 6 and 7, an alternative embodiment is shown, which differs from the above-described embodiment merely in that the countersunk bottom surface 12 adjacent to the slope surface 11 has a limited extension, more precisely by transforming into a land 23 the top surface of which is located at a higher level than the lowest located portion of the bottom surface 12. In such a way, a chip-breaking surface 24 is formed in the transition between the bottom surface 12 and the land 23. In other words, in this case the bottom surface 12 forms a flute-like configuration, rather than extending along a large part of the top side of the cutting insert.

However, in accordance with the principle of the invention, a shoulder 15 is still formed adjacent to each one of the four corners of the cutting insert. The top side of the individual shoulder should extend at least up to the area of the chip surface 24, as can be clearly seen in FIG. 6.

In FIG. 7, it is shown how the slope surface 11 forms an acute angle β with the neutral plane of the cutting insert. In the example, this angle is 10°, although it may vary within fairly wide limits. However, in practice, the angle β should amount to at least 5°, suitably at least 7°. On the other hand, it should not exceed 25° and preferably not 20°. If it is assumed that the angle β amounts to only 10° at the same time as the angle α amounts to 20°, the angle (lacking reference designation) between the slope surface 11 and the clearance surface 3 will amount to 60° (which is the case in the example shown). Also this angle may vary, preferably within a range of from 50° or 55° and upward.

A fundamental advantage of the cutting insert according to the invention is that the same—while keeping the efficient chip-removing ability of the main edge as a consequence of the sloping surface 11—by the presence of the shoulders adjacent to each corner, obtains a considerably improved strength and service life in the area of the cutting insert particularly susceptible to so-called topslice fracture, namely in the area of each corner of the insert. Not only the mechanical strengthening, which the material in the shoulders entails, but also the capability of the shoulders to carry off heat from the secondary edge contributes to the durability of the cutting insert according to the invention. Therefore, in combination with suitable cooling, the temperature of the material in the immediate vicinity of the secondary edge can be lowered substantially, something which in turn counteracts the tendency for topslice fracture. The above-mentioned advantages and improvements vouch, in turn, for the fact that the cutting insert can be used without problems when large axial angles are desirable.

However, it should be understood that the dimensions of the above-described shoulders in practice are moderate. In medium-sized cutting inserts (having an edge length within the range of 10-20 mm), accordingly, the individual shoulder can have a thickness within the range of 0.05-0.15 mm. In this connection, the thickness is determined by the level difference between the top side or the highest located point of the shoulder and the lowest located point of the surrounding, countersunk chip surface.

The invention is not limited only to the embodiments described above and shown in the drawings. Thus, the shape and dimensions of the individual shoulder may vary most considerably within the scope of the subsequent claims. For instance, the top side of the shoulder does not necessarily need to be planar, but may instead have, for instance, a curved shape or a shape otherwise deviating from the planar shape. Thus, in the top surface of the shoulder, it is feasible to form different types of chip-guiding or chip-affecting formations, such as grooves and the like. Furthermore, the top surface of the shoulder may be located in another way than the one shown. For instance, said top surface may be formed in such a way that the same leans or curves in the direction inward/upward from the secondary edge in order to, after a highest crown, again lean inward/downward in the extension thereof toward the center of the cutting insert. Although it is preferred to let the inwardly/downwardly leaning slope surface positioned inside the main edge extend along the entire length of the main edge, the extension of the same may also be somewhat reduced, namely if a more limited cutting depth can be accepted. Furthermore, it should be emphasized that the invention is applicable also to cutting inserts having another number of co-operating pairs of secondary and main edges than four.

The invention claimed is:

1. A positive face milling insert, comprising:
a top side serving as a chip surface, a bottom side, a number of clearance surfaces therebetween, and a pair of chip-removing main cutting edges which are spaced apart from a center of the insert and meet at a corner where they transform into a surface wiping secondary edge, which is intersected by a bisector defining said corner between the main cutting edges, a rake surface along each main cutting edge sloping towards a countersunk bottom surface, and each clearance surface forming an acute angle with the top side so as to give the insert its positive geometry,
wherein a shoulder, having a certain thickness, protrudes from the bottom surface and rake surface, said shoulder having a top surface which extends inwardly from the secondary edge along the bisector and transforms into each rake surface via a leaning side transition surface providing the level difference between said top and rake surfaces and forming a termination of the rake surface.

2. The face milling insert according to claim 1, wherein a width of the shoulder in proximity of the secondary edge is substantially as large as a length of said secondary edge.

3. The face milling insert according to claim 1, wherein said main cutting edges and secondary edges are located in a common plane to or over which said shoulders project.

4. The face milling insert according to claim 1, wherein a width of the top side in the direction of the center of the shoulder successively increases from the secondary edge.

5. The face milling insert according to claim 1, wherein the top surface of the shoulder is planar and parallel to the top side of the insert.

6. The face milling insert according to claim 1, wherein at least a part of the top surface is leaning in the direction inward/upward from the secondary edge.

* * * * *